US012051866B2

(12) United States Patent
Meng et al.

(10) Patent No.: US 12,051,866 B2
(45) Date of Patent: Jul. 30, 2024

(54) ELECTRICAL CONNECTOR ASSEMBLY

(71) Applicant: ADVANCED-CONNECTEK INC., New Taipei (TW)

(72) Inventors: Ta-Teh Meng, New Taipei (TW); Mei Shi, New Taipei (TW); Ya-Ping Liang, New Taipei (TW); Xu-Kun Li, New Taipei (TW); Meng Liu, New Taipei (TW); Bo-Wen Xu, New Taipei (TW); Jia-Ying Wu, New Taipei (TW); Man Ge, New Taipei (TW)

(73) Assignee: ADVANCED-CONNECTEK INC., New Taipei (TW)

( * ) Notice: Subject to any disclaimer, the term of this patent is extended or adjusted under 35 U.S.C. 154(b) by 396 days.

(21) Appl. No.: 17/679,468

(22) Filed: Feb. 24, 2022

(65) Prior Publication Data

US 2022/0271455 A1 Aug. 25, 2022

(30) Foreign Application Priority Data

Feb. 24, 2021 (CN) ........................ 202110202346.X

(51) Int. Cl.

| | |
|---|---|
| ***H01R 12/71*** | (2011.01) |
| ***H01R 13/516*** | (2006.01) |
| ***H01R 13/627*** | (2006.01) |
| ***H01R 13/629*** | (2006.01) |
| ***H01R 13/639*** | (2006.01) |

(52) U.S. Cl.

CPC ......... *H01R 12/716* (2013.01); *H01R 13/516* (2013.01); *H01R 13/6271* (2013.01); *H01R 13/629* (2013.01); *H01R 13/639* (2013.01)

(58) Field of Classification Search

CPC H01R 13/516; H01R 13/6271; H01R 13/629; H01R 13/639; H01R 13/6275; H01R 13/6278; H01R 12/714; H01R 12/716

USPC ..................................... 439/150, 152, 65, 74

See application file for complete search history.

(56) References Cited

U.S. PATENT DOCUMENTS 5,070,529 A * 12/1991 Beaufort .............. H01R 12/716 439/74
5,971,790 A * 10/1999 Rohde .................. H01R 13/627 439/350
6,419,499 B1 * 7/2002 Bundza ................ H05K 7/1451 439/377
7,618,270 B2 * 11/2009 Scherer .............. H01R 12/7005 439/152

(Continued)

*Primary Examiner* — Marcus E Harcum
(74) *Attorney, Agent, or Firm* — MUNCY GEISSLER OLDS & LOWE P.C.

(57) ABSTRACT

An electrical connector assembly includes an electrical plug connector and an electrical receptacle connector corresponding to the electrical plug connector. The electrical plug connector includes a plug insulated housing as well as plug terminals and buckling portions on the plug insulated housing. The electrical receptacle connector includes a receptacle insulated housing as well as receptacle terminals and locking components on the receptacle insulated housing. The locking components at the two sides of the electrical receptacle connector are firmly buckled with the buckling portions at the two sides of the electrical plug connector. Therefore, during the use of the electrical connector assembly, the electrical plug connector can be prevented from detaching off the electrical receptacle connector.

18 Claims, 10 Drawing Sheets

(56) References Cited

U.S. PATENT DOCUMENTS

| | | | | |
|---|---|---|---|---|
| 8,449,314 | B1 * | 5/2013 | Feist | H01R 13/512<br>439/358 |
| 9,904,021 | B2 * | 2/2018 | Wu | G02B 6/3885 |
| 10,283,908 | B1 * | 5/2019 | Simmons | H01R 13/635 |
| 10,615,540 | B2 * | 4/2020 | Hou | H01R 13/405 |
| 2007/0202732 | A1 * | 8/2007 | Yahiro | H01R 13/6275<br>439/326 |
| 2008/0050961 | A1 * | 2/2008 | Johnson | H01R 13/6275<br>439/352 |
| 2009/0023319 | A1 * | 1/2009 | Hou | H01R 13/629<br>439/159 |
| 2010/0167558 | A1 * | 7/2010 | Guan | H01R 12/707<br>439/65 |
| 2012/0135618 | A1 * | 5/2012 | Shen | H01R 13/62988<br>439/152 |
| 2012/0231637 | A1 * | 9/2012 | Takeuchi | H01R 12/716<br>439/65 |
| 2012/0276780 | A1 * | 11/2012 | Hu | H01R 13/6591<br>439/630 |
| 2014/0273585 | A1 * | 9/2014 | Dang | H01R 13/6275<br>439/345 |
| 2015/0064942 | A1 * | 3/2015 | Takemoto | H01R 12/7029<br>439/74 |
| 2016/0093978 | A1 * | 3/2016 | Phillips | H01R 13/6275<br>439/310 |
| 2018/0076587 | A1 * | 3/2018 | Herring | H01R 27/02 |
| 2018/0090864 | A1 * | 3/2018 | Niu | H01R 13/645 |
| 2019/0058275 | A1 * | 2/2019 | Li | H01R 13/504 |
| 2019/0067838 | A1 * | 2/2019 | Ju | H01R 13/62938 |
| 2019/0074616 | A1 * | 3/2019 | Hou | H01R 13/631 |
| 2019/0123464 | A1 * | 4/2019 | Pucher | H01R 12/87 |
| 2019/0372270 | A1 * | 12/2019 | Masunaga | H01R 13/627 |
| 2020/0313348 | A1 * | 10/2020 | Liu | H01R 13/639 |
| 2021/0194162 | A1 * | 6/2021 | Sugaya | H01R 13/639 |
| 2021/0351546 | A1 * | 11/2021 | Wang | H01R 13/6275 |
| 2021/0408727 | A1 * | 12/2021 | Fan | H01R 13/6275 |
| 2022/0085548 | A1 * | 3/2022 | Yi | H01R 12/7047 |
| 2022/0181809 | A1 * | 6/2022 | Xie | H01R 12/716 |
| 2022/0190516 | A1 * | 6/2022 | Phillips | H01R 12/7005 |

* cited by examiner

ELECTRICAL CONNECTOR ASSEMBLY

CROSS-REFERENCE TO RELATED APPLICATION

This non-provisional application claims priority under 35 U.S.C. § 119(a) to Patent Application No. 202110202346.X filed in China, P.R.C. on Feb. 24, 2021, the entire contents of which are hereby incorporated by reference.

FIELD OF THE INVENTION

The instant disclosure relates to an electrical connector, and more particular to an electrical connector assembly, such as a board-to-board electrical connector assembly.

BACKGROUND

Electrical devices, especially consumer portable products, tend to become smaller, thinner, and lighter. An electrical device usually includes different circuit boards therein which need to be electrically connected to each other. In order to improve the utilization rate of the space inside the electrical device, the different circuit boards are usually applied with a board to board (BTB) electrical connector for electrical connection.

SUMMARY OF THE INVENTION

The BTB electrical connector is an electrical connector assembly. In general, the electrical connector assembly includes a plug connector and a receptacle connector corresponding to the plug connector. For a BTB electrical connector known to the inventor, the buckling component on the receptacle connector is applied to buckle with the plug connector. However, since the buckling component is provided on the edge portion of the receptacle connector, a space is to be provided at the edge portion of the receptacle connector for the movement of the buckling component. As a result, the space of the product is used and occupied. Moreover, since the buckling component is at the single side of the receptacle connector, the user and the operator have to take care about the operating direction during the manufacturing process and the operation. For another BTB electrical connector known to the inventor, a metal piece is disposed on the receptacle connector. Therefore, when the plug connector is mated with the receptacle connector, the metal piece is buckled with the tongue portion of the plug connector. In order to unlock the BTB electrical connector, an additional unlocking member is applied to push the metal piece to detach from the tongue portion, so that the plug connector can be detached from the receptacle connector. However, since the unlocking member is provided for contacting the metal piece thus making the metal piece tend to be elastic fatigue easily. Moreover, the use of the unlocking member may also damage the receptacle insulated housing or the metal piece of the receptacle connector easily.

In view of this, an embodiment of the instant disclosure provides an electrical connector assembly. The electrical connector assembly comprises an electrical plug connector and an electrical receptacle connector corresponding to the electrical plug connector. The electrical plug connector comprises a plug insulated housing, a plurality of plug terminals, and a plurality of buckling portions. The plug terminals are at the plug insulated housing, and the buckling portions are at two sides of the plug insulated housing. The electrical receptacle connector comprises a receptacle insulated housing, a plurality of receptacle terminals, and a plurality of locking components. The receptacle terminals are at the receptacle insulated housing and correspond to the plug terminals. Each of two sides of the receptacle insulated housing has a positioning portion. Each of the locking components comprises a locking member and an elastic member. The locking member is pivotally connected to the positioning portion, the elastic member is at the positioning portion to push against the locking member, and each of the locking members of the electrical receptacle connector is buckled with a corresponding one of the buckling portions of the electrical receptacle connector.

In some embodiments of the instant disclosure, the electrical receptacle connector comprises a plurality of shells, and the shells are positioned at the two sides of the receptacle insulated housing and cover the locking components.

In some embodiments of the instant disclosure, each of the shells of the electrical receptacle connector comprises a pivoting portion and an abutting portion. Each of the two sides of the receptacle insulated housing has a shaft portion pivotally connected to a corresponding one of the locking members, the pivoting portion is pivotally connected to the shaft portion and leans against the locking member, and the abutting portion leans against the locking member.

In some embodiments, the electrical plug connector comprises a plurality of fixation members, and the fixation members cover the two sides of the plug insulated housing. Each of the buckling portions comprises a buckling hole and a recessed portion. Each of the buckling holes is at a corresponding one of the fixation members, the recessed portions are at two side walls of the plug insulated housing, and each of the locking members is buckled with a corresponding one of the buckling holes and a corresponding one of the recessed portions.

In some embodiments, each of the locking members of the electrical receptacle connector comprises a pivoting shaft, an engaging portion, an insertion portion, and a pressing portion. The insertion portion is inserted into the elastic member, the engaging portion and the insertion portion are respectively at two sides of the pivoting shaft, and the pressing portion is exposed from the receptacle insulated housing.

In some embodiments, the pressing portion of the electrical receptacle connector has a trident structure, and the trident structure has a plurality of bent blocks extending toward different directions.

In some embodiments, the engaging portion of the electrical receptacle connector has a guiding portion, the fixation member of the electrical plug connector has a curved portion, and the guiding portion is in contact with the curved portion.

In some embodiments, the receptacle insulated housing of the electrical receptacle connector comprises a mating groove receiving the plug insulated housing of the electrical plug connector. Each of the positioning portions of the electrical receptacle connector has a groove and a limiting slot, each of the grooves receives a corresponding one of the locking components and is in communication with the mating groove, and each of the limiting slots is at an inner side of a corresponding one of the grooves and receives a corresponding one of the elastic members.

In some embodiments, one end of the locking component is selectively at a buckled position of the mating groove or an unlocked position of the groove. When the end of the locking component is at the buckled position, the end of the locking component is buckled with the buckling portion of the electrical plug connector. When the end of the locking component is at the unlocked position, the end of the locking component is detached from the buckling portion of the electrical plug connector.

In some embodiments, the end of the locking component is moved between the buckled position and the unlocked position by rotating.

Another embodiment of the instant disclosure provides an electrical connector assembly. The electrical connector assembly comprises an electrical receptacle connector. The electrical receptacle connector comprises a receptacle insulated housing, a plurality of receptacle terminals, and a plurality of locking components. The receptacle terminals are at the receptacle insulated housing. Each of two sides of the receptacle insulated housing has a positioning portion. Each of the locking components comprises a locking member and an elastic member. The locking member is pivotally connected to the positioning portion, the elastic member is at the positioning portion to push against the locking member, and each of the locking members of the electrical receptacle connector is buckled with a corresponding one of buckling portions of an electrical receptacle connector.

In some embodiments, the electrical receptacle connector comprises a plurality of shells, and the shells are positioned at the two sides of the receptacle insulated housing and cover the locking components.

In some embodiments, each of the shells of the electrical receptacle connector comprises a pivoting portion and an abutting portion. Each of the two sides of the receptacle insulated housing has a shaft portion pivotally connected to a corresponding one of the locking members, the pivoting portion is pivotally connected to the shaft portion and leans against the locking member, and the abutting portion leans against the locking member.

In some embodiments, the electrical plug connector comprises a plug insulated housing, a plurality of plug terminals, the plurality of buckling portions, and a plurality of fixation members. The plug terminals are at the plug insulated housing, and the buckling portions are at two sides of the plug insulated housing. The fixation members cover the two sides of the plug insulated housing. Each of the buckling portions comprises a buckling hole and a recessed portion. Each of the buckling holes is at a corresponding one of the fixation members, the recessed portions are at two side walls of the plug insulated housing, and each of the locking members is buckled with a corresponding one of the buckling holes and a corresponding one of the recessed portions.

In some embodiments, each of the locking members of the electrical receptacle connector comprises a pivoting shaft, an engaging portion, an insertion portion, and a pressing portion. The insertion portion is inserted into the elastic member, the engaging portion and the insertion portion are respectively at two sides of the pivoting shaft, and the pressing portion is exposed from the receptacle insulated housing.

In some embodiments, the pressing portion of the electrical receptacle connector has a trident structure, and the trident structure has a plurality of bent blocks extending toward different directions.

In some embodiments, the engaging portion of the electrical receptacle connector has a guiding portion, the fixation member of the electrical plug connector has a curved portion, and the guiding portion is in contact with the curved portion.

In some embodiments, the receptacle insulated housing of the electrical receptacle connector comprises a mating groove receiving the plug insulated housing of the electrical plug connector. Each of the positioning portions of the electrical receptacle connector has a groove and a limiting slot, each of the grooves receives a corresponding one of the locking components and is in communication with the mating groove, and each of the limiting slots is at an inner side of a corresponding one of the grooves and receives a corresponding one of the elastic members.

In some embodiments, one end of the locking component is selectively at a buckled position of the mating groove or an unlocked position of the groove. When the end of the locking component is at the buckled position, the end of the locking component is buckled with the buckling portion of the electrical plug connector. When the end of the locking component is at the unlocked position, the end of the locking component is detached from the buckling portion of the electrical plug connector.

In some embodiments, the end of the locking component is moved between the buckled position and the unlocked position by rotating.

Based on the above, according to one or some embodiments of the instant disclosure, the locking components at the two sides of the electrical receptacle connector are firmly buckled with the buckling portions at the two sides of the electrical plug connector. Therefore, during the use of the electrical connector assembly, the electrical plug connector can be prevented from detaching off the electrical receptacle connector. According to some embodiments, since the elastic member of the locking component provides an elastic force to push against the locking member, the service life of the locking member can be prolonged and the deformation of the locking member (pin deformation) can be prevented. According to some embodiments, the shells are provided to cover the locking members and lean against the locking members, thereby limiting the movement of the locking members and preventing the locking members from detaching off the receptacle insulated housing.

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
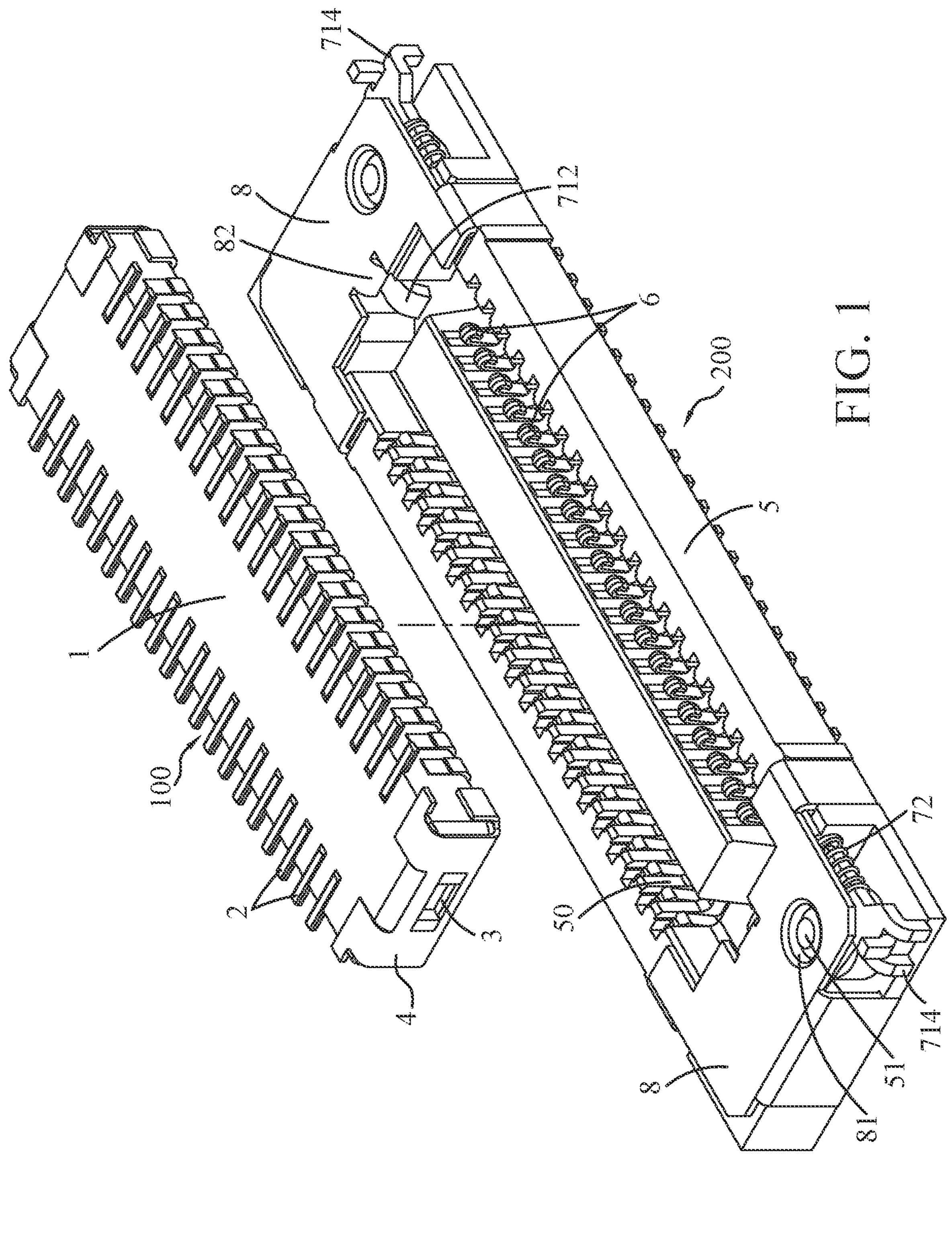
FIG. 1 illustrates a perspective view of an electrical plug connector and an electrical receptacle connector according to some embodiments of the instant disclosure, where the electrical plug connector is not inserted into the electrical receptacle connector.
Figure 2:
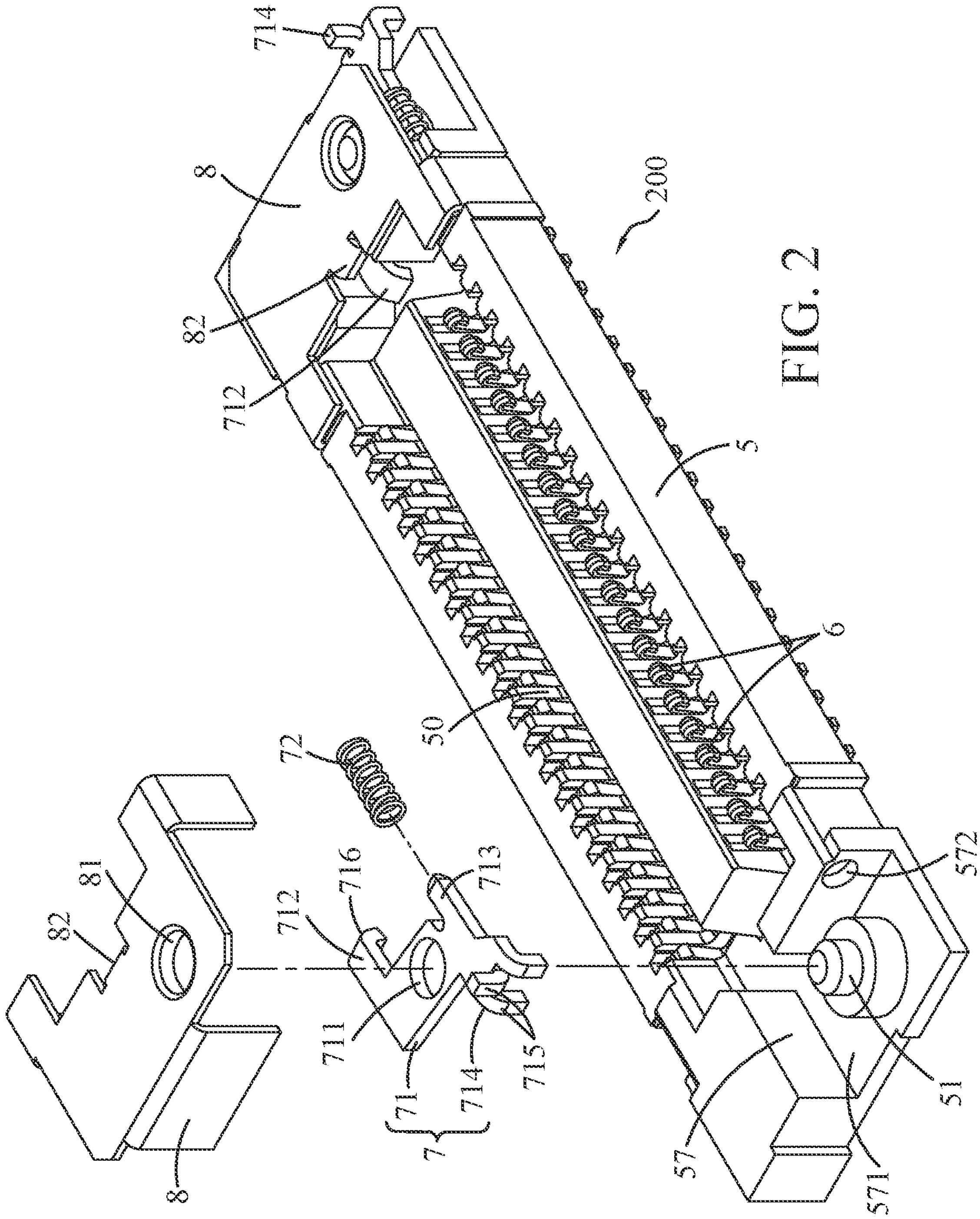
FIG. 2 illustrates an exploded view of the electrical receptacle connector according to some embodiments of the instant disclosure, where the receptacle terminals are not detached from the receptacle insulated housing.
Figure 3:
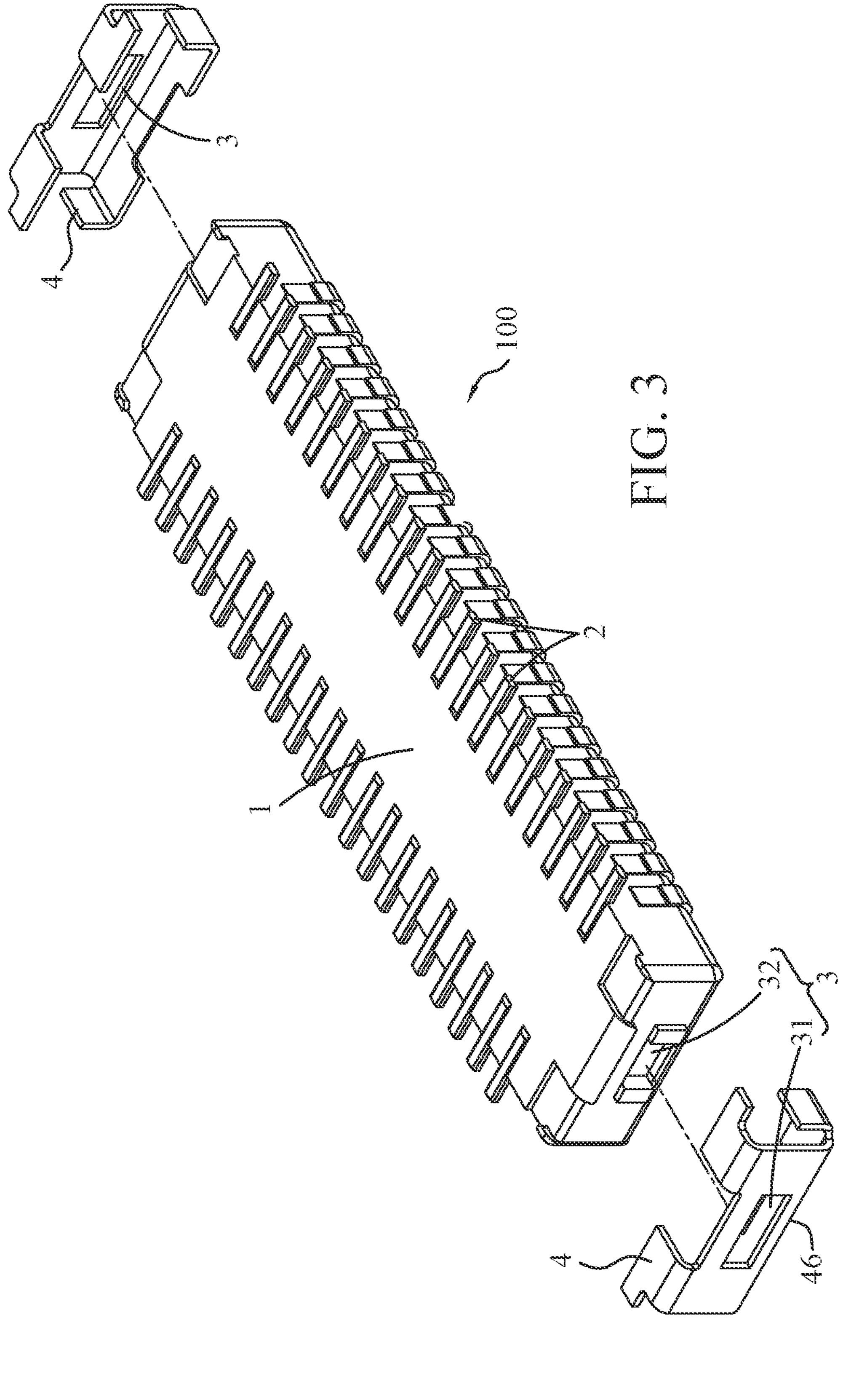
FIG. 3 illustrates an exploded view of the electrical plug connector according to some embodiments of the instant disclosure, where the plug terminals are not detached from the plug insulated housing.

Please refer to FIG. 1 to FIG. 3. FIG. 1 illustrates a perspective view of an electrical plug connector 100 and an electrical receptacle connector 200 according to some embodiments of the instant disclosure, where the electrical plug connector 100 is not inserted into the electrical receptacle connector 200. FIG. 2 illustrates an exploded view of the electrical receptacle connector 200 according to some embodiments of the instant disclosure, where the receptacle terminals 6 are not detached from the receptacle insulated housing 5. FIG. 3 illustrates an exploded view of the electrical plug connector 100 according to some embodiments of the instant disclosure, where the plug terminals 2 are not detached from the plug insulated housing 1. In some embodiments, the electrical plug connector 100 comprises a plug insulated housing 1, a plurality of plug terminals 2, and a plurality of buckling portions 3. The electrical receptacle connector 200 comprises a receptacle insulated housing 5, a plurality of receptacle terminals 6, and a plurality of locking components 7.

Please refer to FIG. 1 and FIG. 3. In some embodiments, the plug terminals 2 of the electrical plug connector 100 are at the plug insulated housing 1, and the buckling portions 3 are at two sides of the plug insulated housing 1.

Figure 8:
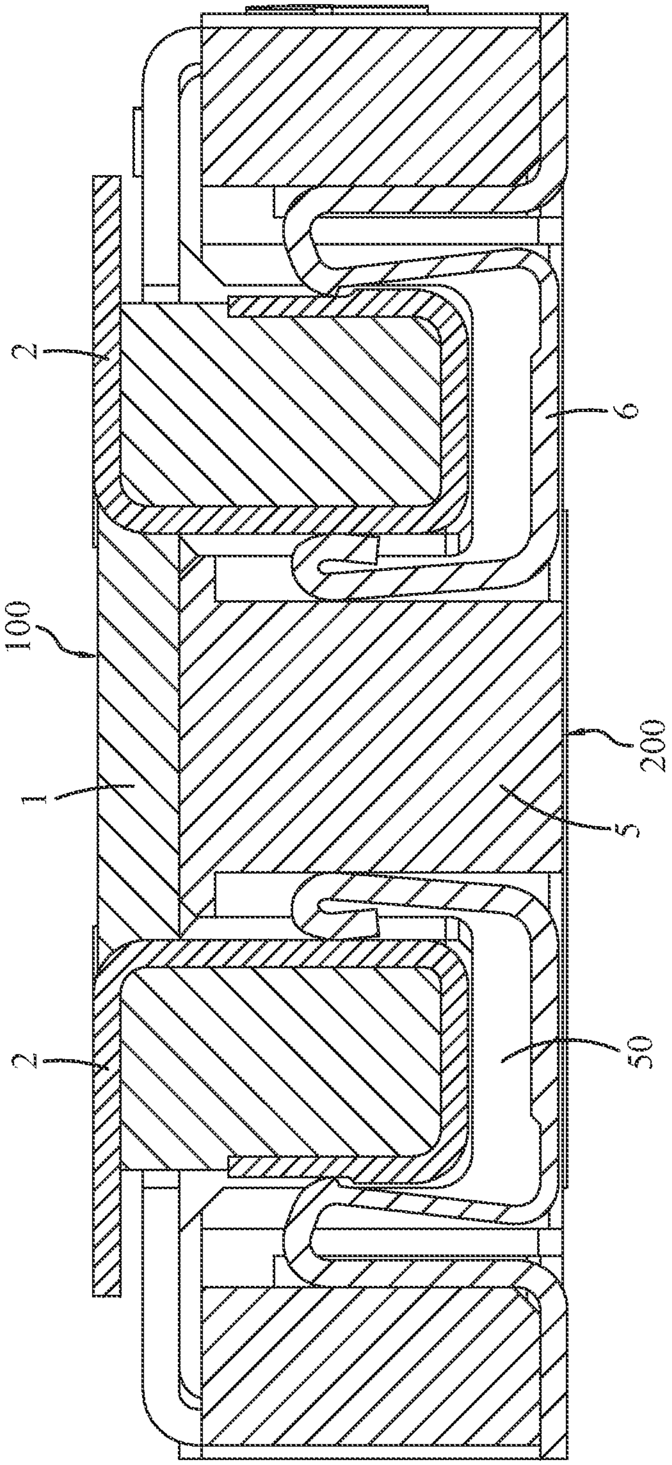
FIG. 8 illustrates a cross-sectional view of the portion C-C shown in FIG. 6, where the locking member is buckled with the buckling portion.

Please refer to FIG. 1 and FIG. 2. In some embodiments, the receptacle terminals 6 of the electrical receptacle connector 200 are at the receptacle insulated housing 5, and the receptacle terminals 6 correspond to the plug terminals 2 (as shown in FIG. 8). Two sides of the receptacle insulated housing 5 have positioning portions 57. Each of the locking components 7 comprises a locking member 71 and an elastic member 72. The locking member 71 is pivotally connected to the positioning portion 57. The elastic member 72 is at the positioning portion 57 to push against the locking member 71. Each of the locking members 71 of the electrical receptacle connector 200 is buckled with a corresponding one of the buckling portions 3 of the electrical plug connector 100.

Figure 4:
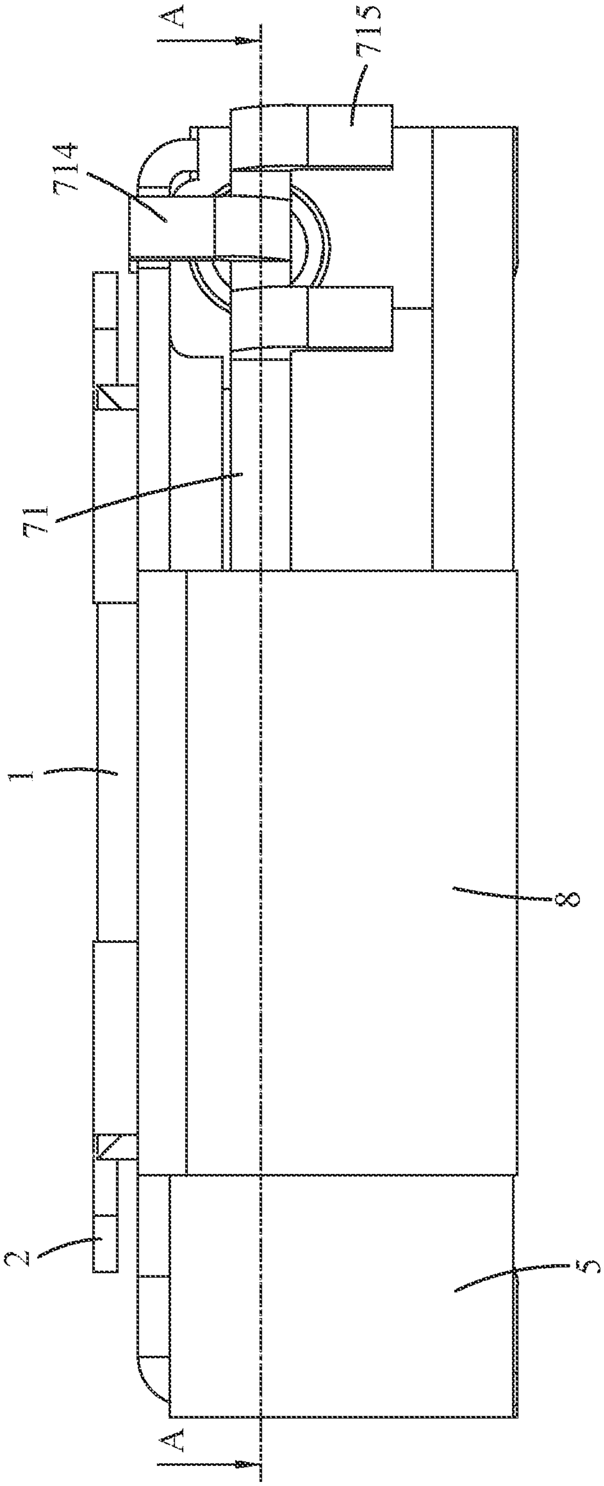
FIG. 4 illustrates a lateral schematic view of the electrical plug connector and the electrical receptacle connector according to some embodiments of the instant disclosure, where the electrical plug connector is inserted into the electrical receptacle connector.
Figure 5:
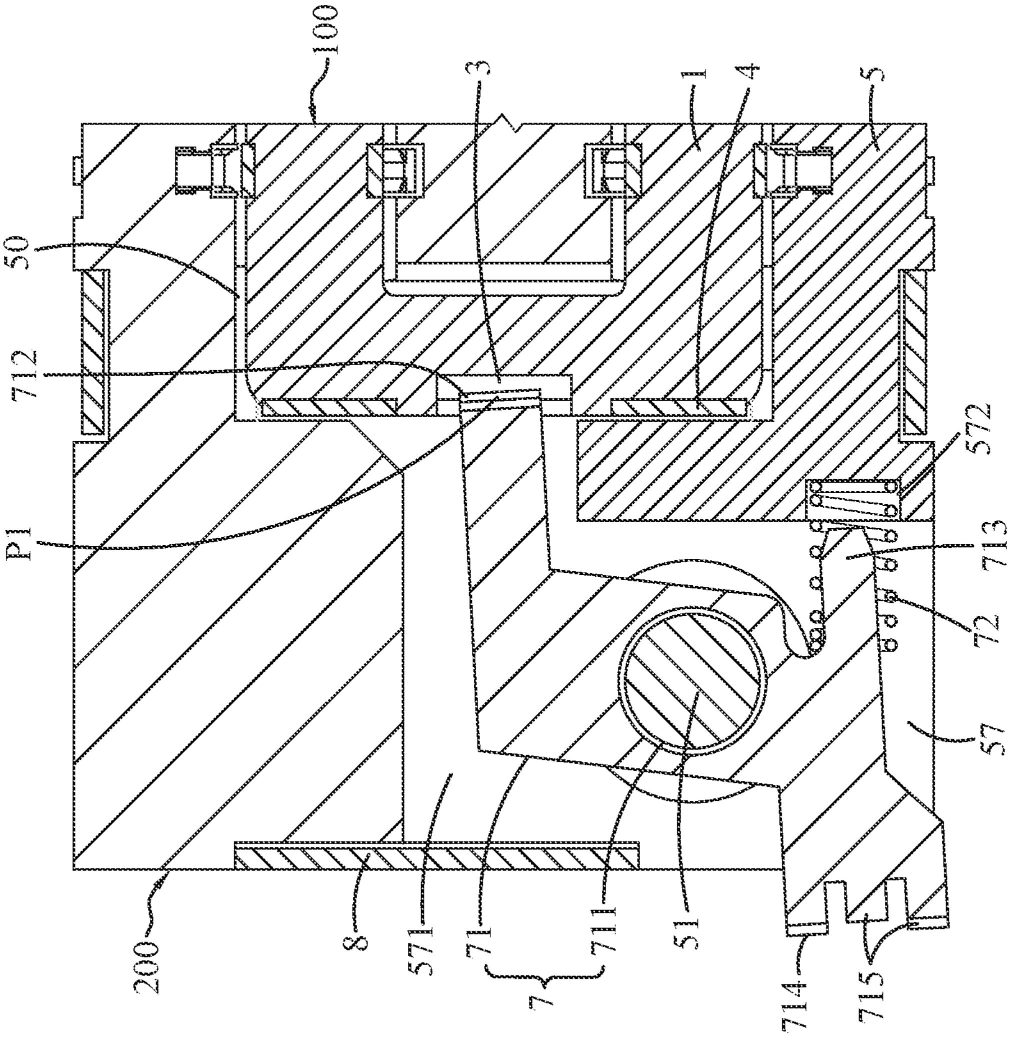
FIG. 5 illustrates a cross-sectional view of the portion A-A shown in FIG. 4, where the locking member is buckled with the buckling portion.
Figure 6:
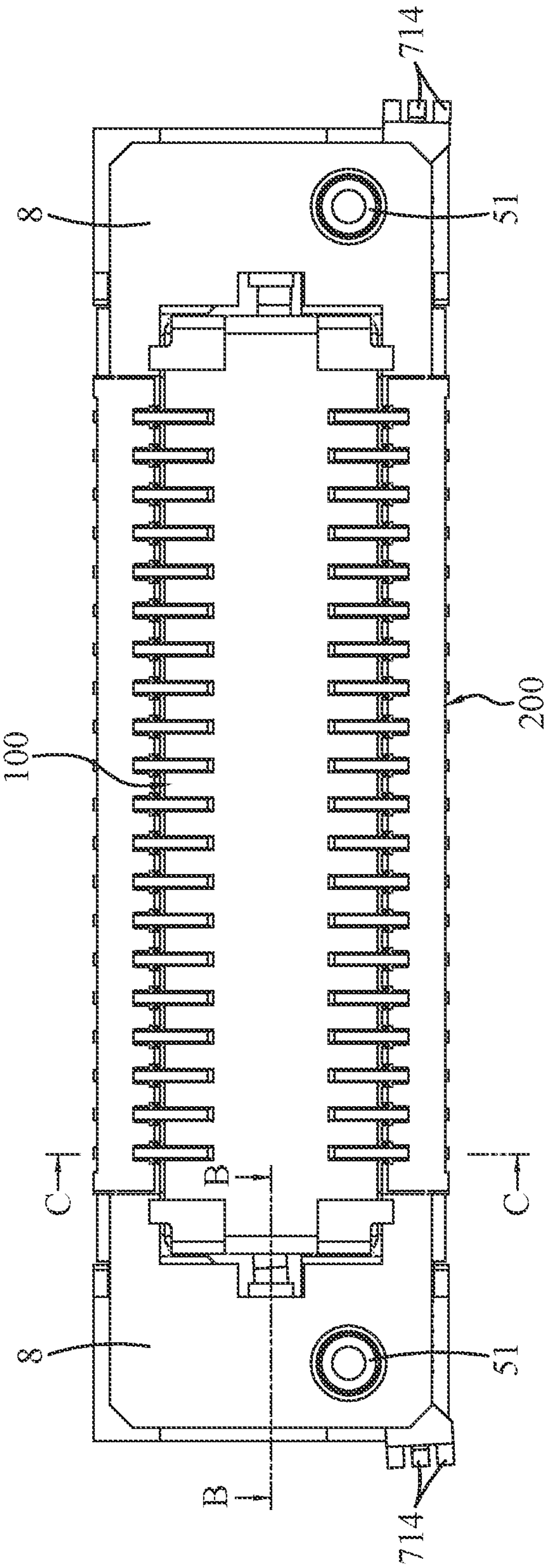
FIG. 6 illustrates a top schematic view of the electrical plug connector and the electrical receptacle connector, where the electrical plug connector is inserted into the electrical receptacle connector.
Figure 7:
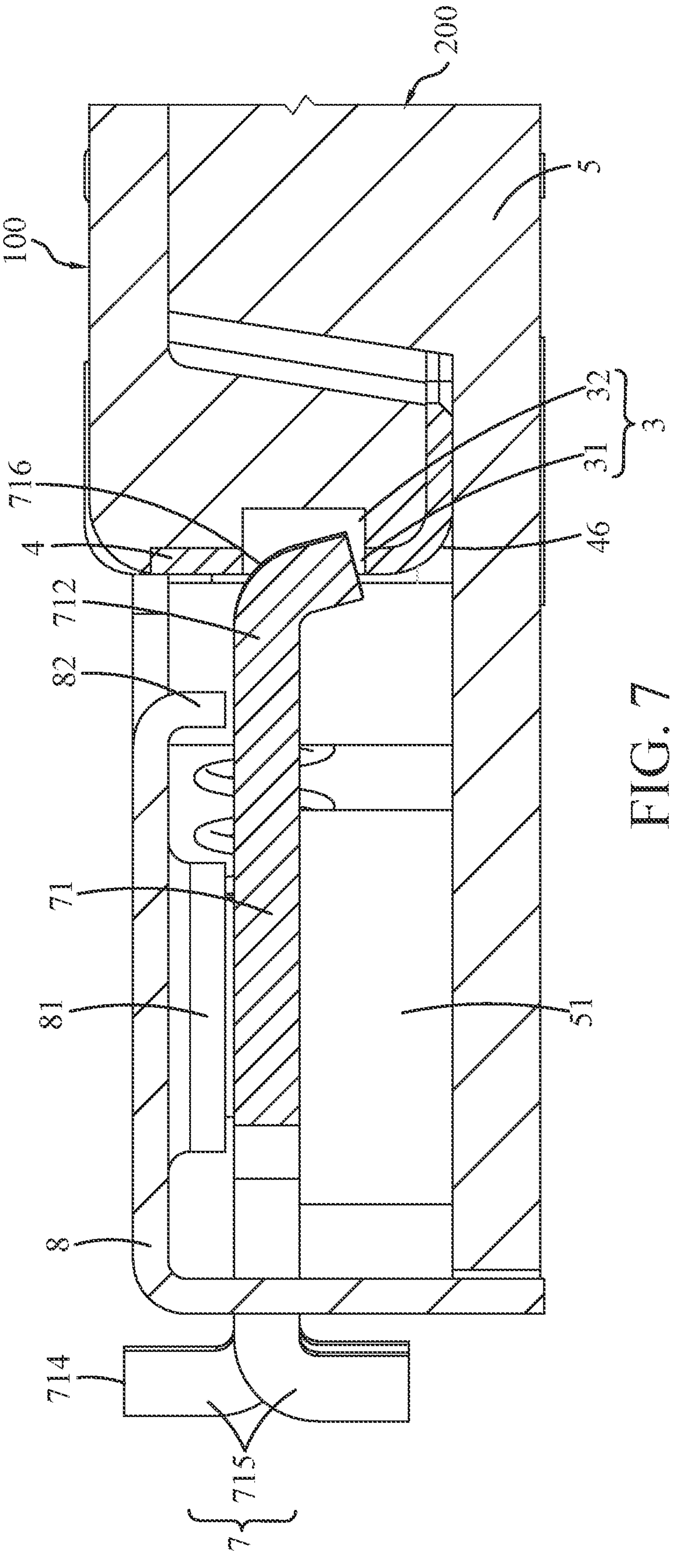
FIG. 7 illustrates a cross-sectional view of the portion B-B shown in FIG. 6, where the locking member is buckled with the buckling portion.

Please refer to FIG. 2 and FIG. 4 to FIG. 7. FIG. 4 illustrates a lateral schematic view of the electrical plug connector 100 and the electrical receptacle connector 200 according to some embodiments of the instant disclosure, where the electrical plug connector 100 is inserted into the electrical receptacle connector 200. FIG. 5 illustrates a cross-sectional view of the portion A-A shown in FIG. 4, where the locking member 71 is buckled with the buckling portion 3. FIG. 6 illustrates a top schematic view of the electrical plug connector 100 and the electrical receptacle connector 200, where the electrical plug connector 100 is inserted into the electrical receptacle connector 200. FIG. 7 illustrates a cross-sectional view of the portion B-B shown in FIG. 6, where the locking member 71 is buckled with the buckling portion 3. In some embodiments, the receptacle insulated housing 5 of the electrical receptacle connector 200 comprises a mating groove 50 for being inserted by the plug insulated housing 1 of the electrical plug connector 100. When the electrical plug connector 100 is inserted into the mating groove 50 of the electrical receptacle connector 200, the locking components 7 at the two sides of the electrical receptacle connector 200 are firmly buckled with the buckling portions 3 at the two sides of the electrical plug connector 100. Therefore, during the use of the electrical connector assembly, the electrical plug connector 100 can be prevented from detaching off the electrical receptacle connector 200. In some embodiments, the guiding portion 716 of the locking component 7 is flexibly buckled with the buckling portion 3 to prevent the locking component 7 from rigidly contacting the buckling portion 3. Therefore, during the use of the electrical connector assembly, the electrical plug connector 100 can be prevented from detaching off the electrical receptacle connector 200.

Please refer to FIG. 3 and FIG. 8. FIG. 8 illustrates a cross-sectional view of the portion C-C shown in FIG. 6, where the locking member 7 is buckled with the buckling portion 3. In some embodiments, the plug insulated housing 1 of the electrical plug connector 100 is an elongated plastic member. The plug insulated housing 1 comprises a bottom wall, a pair of first side walls, and a pair of first end walls. The first side walls are opposite to and parallel with each other. The first end walls are opposite to and parallel with each other. The pair of the first side walls is disposed on the bottom wall along a longitudinal direction, and the pair of the first end walls is disposed on the bottom wall along a transverse direction. The pair of the first side walls and the pair of the first end walls are enclosed to form a recessed groove and are formed as a rectangular structure. The plug terminals 2 are disposed on the pair of the first side walls.

Please refer to FIG. 3 and FIG. 8. In some embodiments, the plug terminals 2 are disposed on the plug insulated housing 1. The plug terminals 2 are arranged into two rows opposite to each other. Each of the plug terminals 2 comprises a first contact portion, a second contact portion, and a first tail portion. The first contact portion, the second contact portion, and the first tail portion are integrally formed as a hook structure. The first tail portion extends out of the plug insulated housing 1. The first contact portion is in the mating groove 50 and leans against one of two surfaces of the first side wall, and the second contact portion is at the other surface of the first side wall. The plug terminals 2 are provided for signal transmission or current transmission, where the current is between 0.3 A and 0.5 A.

Please refer to FIG. 3, FIG. 7, and FIG. 8. In some embodiments, each of the buckling portions 3 of the electrical plug connector 100 is approximately of a U-shaped plate. The buckling portions 3 are provided for covering. The buckling portions 3 cover the end walls of the plug insulated housing 1 to improve the structural strength of the product. The electrical plug connector 100 comprises a plurality of fixation members 4. The fixation members 4 cover two sides of the plug insulated housing 1. Each of the buckling portions 3 comprises a buckling hole 31 and a recessed portion 32. Each of the buckling holes 31 is at a corresponding one of the fixation members 4, the recessed portions 32 are at the two side walls of the plug insulated housing 1, and each of the locking members 71 is buckled with a corresponding one of the buckling holes 31 and a corresponding one of the recessed portions 32.

Please refer to FIG. 2 and FIG. 7. In some embodiments, the electrical receptacle connector 200 comprises a plurality of shells 8. The shells 8 are positioned at the two sides of the receptacle insulated housing 5 and cover the locking components 7. Therefore, in some embodiments, the shells 8 cover and lean against the locking members 71 to limit the movements of the locking members 71. Hence, the locking members 71 can be prevented from detaching off the receptacle insulated housing 5.

Please refer to FIG. 2 and FIG. 7. In some embodiments, each of the shells 8 of the electrical receptacle connector 200 comprises a pivoting portion 81 and an abutting portion 82. The pivoting portion 81 may be, but not limited to, a collar structure formed by drawning techniques. The two sides of the receptacle insulated housing 5 have shaft portions 51. Each of the shaft portions 51 is pivotally connected to the pivoting shaft 711 of a corresponding one of the locking members 71 and a corresponding one of the pivoting portions 81. The pivoting portion 81 is pivotally connected to the shaft portion 51 and leans against the locking member 71, and the abutting portion 82 leans against the locking member 71. The pivoting portion 81 is formed by drawning techniques. The pivoting portion 81 is fitted over the shaft portion 51 (which is made of plastic), so that the structural strength of the shaft portion 51 can be improved. In this embodiment, the pivoting portion 81 is a collar structure, and the pivoting shaft 711 is a shaft hole, and the shaft portion 51 is pivotally connected to the collar structure and the shaft hole, but embodiments are not limited thereto. In some embodiments, the structures of the pivoting portion 81, the pivoting shaft 711, and the shaft portion 51 may be exchanged and may be the collar structure, the shaft hole or the protrusion post.

Figure 9:
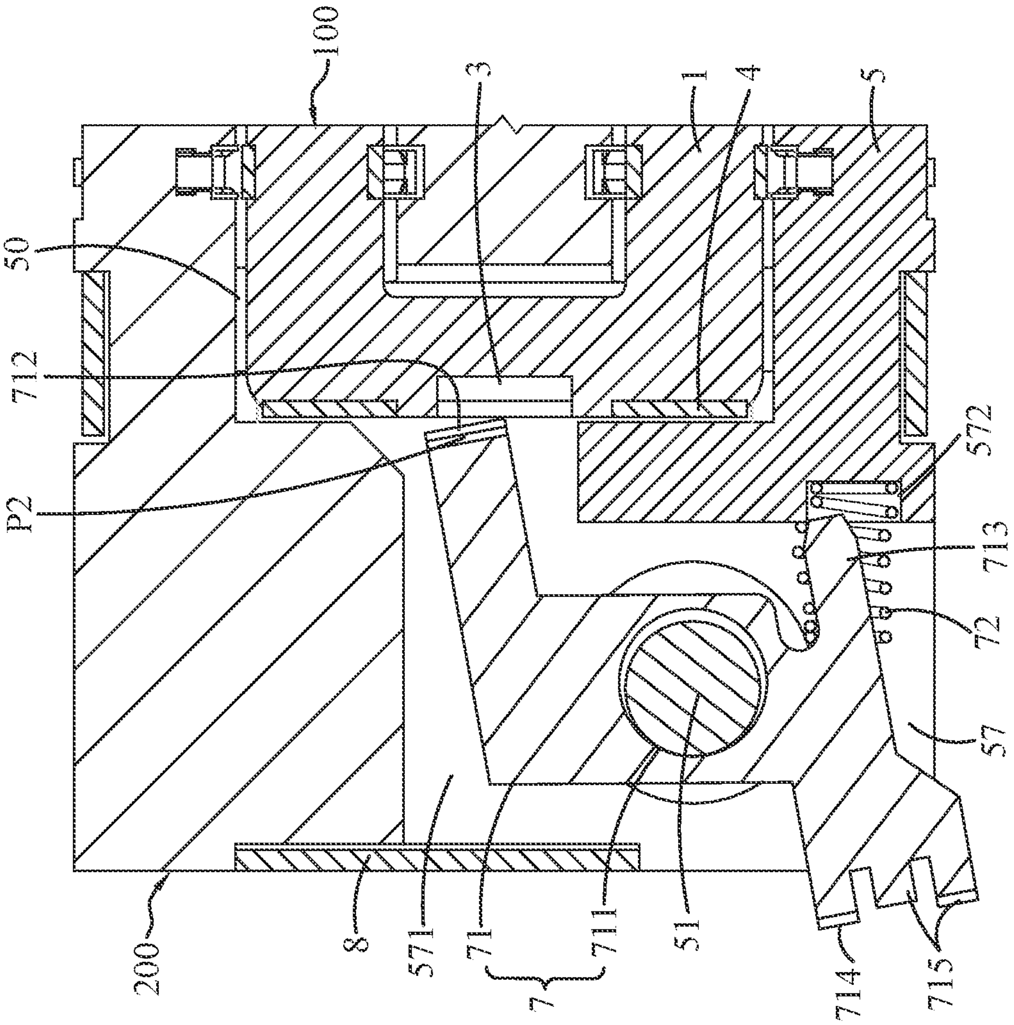
FIG. 9 illustrates a cross-sectional view from the perspective of FIG. 5, where the locking member is detached from the buckling portion.

Please refer to FIG. 2, FIG. 5, and FIG. 9. FIG. 9 illustrates a cross-sectional view from the perspective of FIG. 5, where the locking member 71 is detached from the buckling portion 3. In some embodiments, each of the locking members 71 of the electrical receptacle connector 200 comprises a pivoting shaft 711, an engaging portion 712, an insertion portion 713, and a pressing portion 714. The pivoting shaft 711 may be but not limited to a shaft hole. The insertion portion 713 is inserted into the elastic member 72 (e.g., a spring). The engaging portion 712 and the insertion portion 713 are respectively at two sides of the pivoting shaft 711, and the pressing portion 714 is exposed from the receptacle insulated housing 5.

Please refer to FIG. 2, FIG. 5, and FIG. 9. In some embodiments, one end of the locking component 7 is moved between a buckled position P1 and an unlocked position P2 by rotating. When the pressing portion 714 is pressed by a user's hand or a tool, the locking member 71 is rotated about the shaft portion and is moved like a lever. The locking member 71 is moved toward the elastic member 72 to compress the elastic member 72. The engaging portion 712 at one end of the locking member 71 is rotated, and the engaging portion 712 is moved from the mating groove 50 to the positioning portion 57.

Please refer to FIG. 2, FIG. 5, and FIG. 9. In some embodiments, the pressing portion 714 of the electrical receptacle connector 200 has a trident structure, and the trident structure has a plurality of bent blocks 715 extending toward different directions. The bent blocks 715 allow the user to use his or her hand or use a specialized fixture to touch or tap the pressing portion 714, so that the locking member 71 of the locking component 7 can be moved conveniently. Therefore, the locking member 71 of the locking component 7 can be detached from the buckling portion 3, and the electrical plug connector 100 can be detached form the electrical receptacle connector 200.

Figure 10:
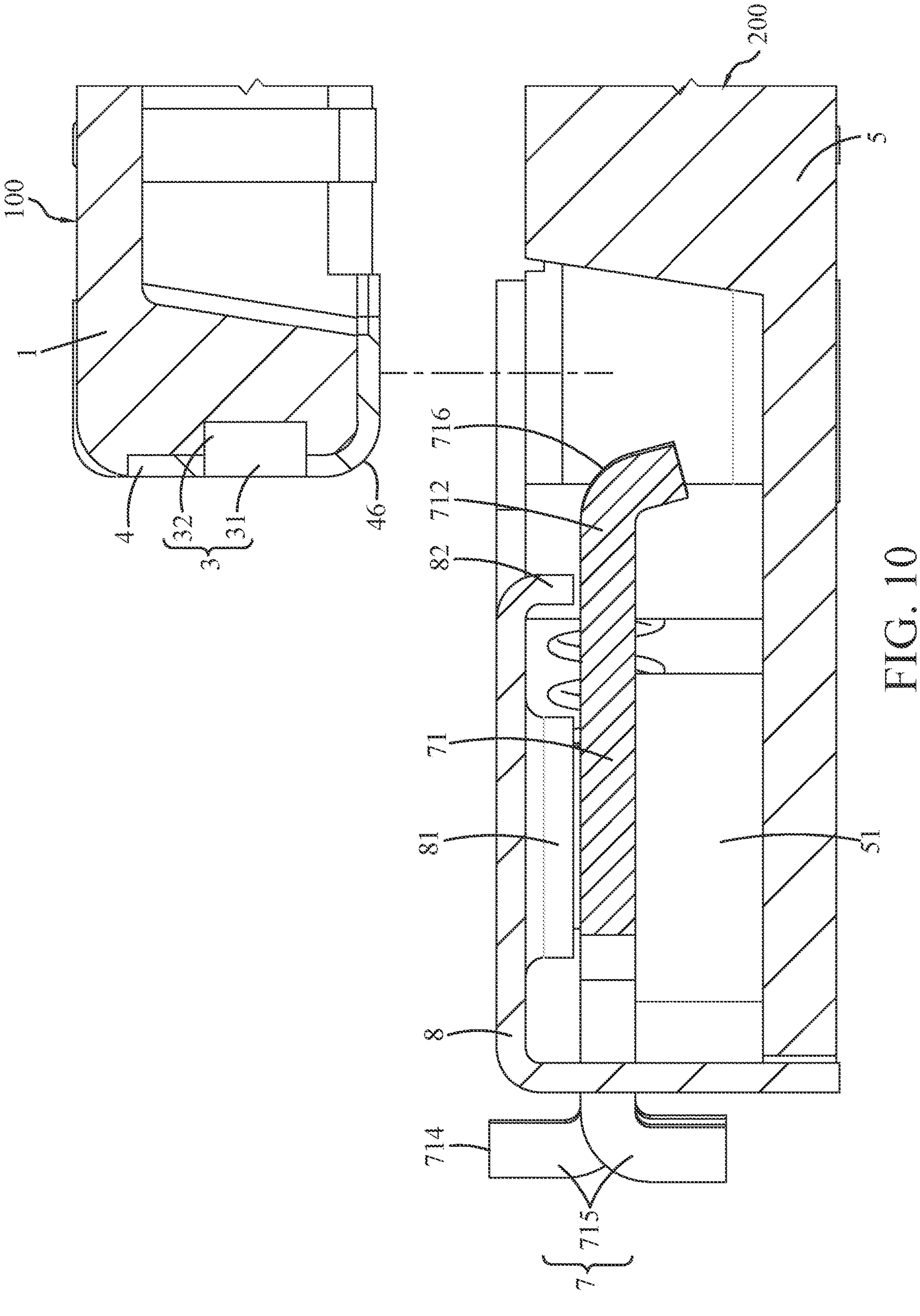
FIG. 10 illustrates a cross-sectional view from the perspective of FIG. 7, where the locking member is detached from the buckling portion.

Please refer to FIG. 2 and FIG. 10. FIG. 10 illustrates a cross-sectional view from the perspective of FIG. 7, where the locking member 71 is detached from the buckling portion 3. In some embodiments, the engaging portion 712 of the electrical receptacle connector 2000 has a guiding portion 716. The fixation member 4 of the electrical plug connector 100 has a curved portion 46, and the guiding portion 716 is in contact with the curved portion 46. In this embodiment, the guiding portion 716 is at the head portion of the engaging portion 712, and the guiding portion 716 may be but not limited to a bent structure in curve shaped. When the electrical plug connector 100 is mated with the electrical receptacle connector 200, the curved portion 46 of the electrical plug connector 100 is directly in contact with the engaging portion 712 of the electrical receptacle connector 200, and the curved portion 46 further pushes the engaging portion 712 of the locking member 71 to move inward the groove 571. Then, by pressing the electrical plug connector 100 toward the mating groove 50, the assembling of the electrical connector assembly can be achieved, without manual operation of the locking member 71 for the assembling of the electrical connector assembly. In this embodiment, when the electrical plug connector 100 is pressed toward the mating groove 50 and positioned with the electrical receptacle connector 200, the user does not need to operate the locking member 71 manually; instead, the locking member 71 is pushed by the elastic force provided by the elastic member 72, so that the locking member 71 is buckled with the buckling portion 3 and thus the electrical plug connector 100 can be positioned and prevented from detaching off the electrical receptacle connector 200.

Please refer to FIG. 2, FIG. 5, and FIG. 9. In some embodiments, each of the positioning portions 57 of the electrical receptacle connector 200 has a groove 571 and a limiting slot 572. Each of the grooves 571 receives a corresponding one of the locking components 7 and in communication with the mating groove 50. Each of the limiting slots 572 is at an inner side of a corresponding one of the grooves 571 and receives a corresponding one of the elastic members 72. Therefore, according to some embodiments, since the elastic member 72 of the locking component 7 provides an elastic force to push against the locking member 71, the locking member 71 is elastically buckled with the buckling portion 3 and the service life of the locking member 71 can be prolonged. Therefore, in one or some embodiments of the instant disclosure, the deformation of the locking member 71 (pin deformation) which is caused by the direct buckling between the locking member 71 and the buckling portion 3 without elastic force, can be prevented.

Please refer to FIG. 2, FIG. 5, and FIG. 9. In some embodiments, one end of the locking component 7 is selectively at the buckled position P1 of the mating groove 50 or the unlocked position P2 of the groove 571. When the end of the locking component 7 is at the buckled position P1, the end of the locking component 7 is buckled with the buckling portion 3 of the electrical plug connector 100. When the end of the locking component 7 is at the unlocked position P2, the end of the locking component 7 is detached from the buckling portion 3 of the electrical plug connector 100.

Please refer to FIG. 2, FIG. 5, and FIG. 8. In some embodiments, the receptacle insulated housing 5 of the electrical receptacle connector 200 is an elongated plastic member. The receptacle insulated housing 5 comprises a bottom wall, a pair of second side walls, and a pair of second end walls. The pair of the second side walls is disposed on the bottom wall along a longitudinal direction, and the pair of the second end walls is disposed on the bottom wall along a transverse direction. The pair of the second side walls and the pair of the second end walls are enclosed to form the mating groove 50 and are formed as a rectangular space. When the electrical plug connector 100 is inserted into the electrical receptacle connector 200, the plug insulated housing 1 of the electrical plug connector is inserted into the mating groove 50.

Please refer to FIG. 2, FIG. 5, and FIG. 8. In some embodiments, the receptacle insulated housing 5 of the electrical receptacle connector 200 comprises a column in the mating groove 50. Terminal grooves are provided between one of the second side walls and one of two sides of the column and are provided between the other second side wall and the other side of the column, and the terminal grooves are arranged along the longitudinal direction. The terminal grooves are defined through the bottom wall and in communication with the mating groove 50. The receptacle terminals 6 are respectively held between one of the second side walls and one of two sides of the column and are held between the other second side wall and the other side of the column.

Please refer to FIG. 2, FIG. 5, and FIG. 8. In some embodiments, the receptacle terminals 6 are arranged on the receptacle insulated housing 5. The receptacle terminals 6 are arranged into two opposite rows. Each of the receptacle terminals 6 comprises a main arm portion, a pair of elastic clamping arms, and a second tail portion. The main arm portion, the pair of elastic clamping arms, and the second tail portion are integrally formed as a U-shaped structure. The second tail portion extends out of the receptacle insulated housing 5. Moreover, each of the receptacle terminals 6 is a blanking type terminal. In some embodiments, the main arm portion is disposed below the bottom wall, and the pair of elastic clamping arms extends outwardly from one side of the main arm portion toward the terminal groove, so that the pair of the elastic clamping arm and the main arm portion are together formed as a U-shaped structure.

Based on the above, according to one or some embodiments of the instant disclosure, the locking components at the two sides of the electrical receptacle connector are firmly buckled with the buckling portions at the two sides of the electrical plug connector. Therefore, during the use of the electrical connector assembly, the electrical plug connector can be prevented from detaching off the electrical receptacle connector. According to some embodiments, since the elastic member of the locking component provides an elastic force to push against the locking member, the service life of the locking member can be prolonged and the deformation of the locking member (pin deformation) can be prevented. According to some embodiments, the shells are provided to cover the locking members and lean against the locking members, thereby limiting the movement of the locking members and preventing the locking members from detaching off the receptacle insulated housing.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An electrical connector assembly, comprising: an electrical plug connector comprising a plug insulated housing, a plurality of plug terminals, and a plurality of buckling portions, wherein the plug terminals are at the plug insulated housing, and the buckling portions are at two sides of the plug insulated housing; and an electrical receptacle connector comprising a receptacle insulated housing, a plurality of receptacle terminals, and a plurality of locking components, wherein the receptacle terminals are at the receptacle insulated housing and correspond to the plug terminals, and each of two sides of the receptacle insulated housing has a positioning portion; each of the locking components comprises a locking member and an elastic member; the locking member is pivotally connected to the positioning portion, the elastic member is at the positioning portion to push against the locking member, and each of the locking members of the electrical receptacle connector is buckled with a corresponding one of the buckling portions of the electrical plug connector; wherein the electrical receptacle connector comprises a plurality of shells, and the shells are positioned at the two sides of the receptacle insulated housing and cover the locking components.

2. The electrical connector assembly according to claim 1, wherein each of the shells of the electrical receptacle connector comprises a pivoting portion and an abutting portion; each of the two sides of the receptacle insulated housing has a shaft portion pivotally connected to a corresponding one of the locking members, the pivoting portion is pivotally connected to the shaft portion and leans against the locking member, and the abutting portion leans against the locking member.

3. The electrical connector assembly according to claim 1, wherein the electrical plug connector comprises a plurality of fixation members, and the fixation members cover the two sides of the plug insulated housing; each of the buckling portions comprises a buckling hole and a recessed portion; each of the buckling holes is at a corresponding one of the fixation members, the recessed portions are at two side walls of the plug insulated housing, and each of the locking members is buckled with a corresponding one of the buckling holes and a corresponding one of the recessed portions.

4. The electrical connector assembly according to claim 1, wherein each of the locking members of the electrical receptacle connector comprises a pivoting shaft, an engaging portion, an insertion portion, and a pressing portion; the insertion portion is inserted into the elastic member, the engaging portion and the insertion portion are respectively at two sides of the pivoting shaft, and the pressing portion is exposed from the receptacle insulated housing.

5. The electrical connector assembly according to claim 4, wherein the pressing portion of the electrical receptacle connector has a trident structure, and the trident structure has a plurality of bent blocks extending toward different directions.

6. The electrical connector assembly according to claim 4, wherein the engaging portion of the electrical receptacle connector has a guiding portion, the fixation member of the electrical plug connector has a curved portion, and the guiding portion is in contact with the curved portion.

7. The electrical connector assembly according to claim 1, wherein the receptacle insulated housing of the electrical receptacle connector comprises a mating groove receiving the plug insulated housing of the electrical plug connector; each of the positioning portions of the electrical receptacle connector has a groove and a limiting slot, each of the grooves receives a corresponding one of the locking components and is in communication with the mating groove, and each of the limiting slots is at an inner side of a corresponding one of the grooves and receives a corresponding one of the elastic members.

8. The electrical connector assembly according to claim 7, wherein one end of the locking component is selectively at a buckled position of the mating groove or an unlocked position of the groove; when the end of the locking component is at the buckled position, the end of the locking component is buckled with the buckling portion of the electrical plug connector; when the end of the locking component is at the unlocked position, the end of the locking component is detached from the buckling portion of the electrical plug connector.

9. The electrical connector assembly according to claim 8, wherein the end of the locking component is moved between the buckled position and the unlocked position by rotating.

10. An electrical connector assembly, comprising: an electrical receptacle connector comprising: a receptacle insulated housing, a plurality of receptacle terminals; and a plurality of locking components, wherein the receptacle terminals are at the receptacle insulated housing; each of two sides of the receptacle insulated housing has a positioning portion; each of the locking components comprises a locking member and an elastic member; the locking member is pivotally connected to the positioning portion, the elastic member is at the positioning portion to push against the locking member, and each of the locking members of the electrical receptacle connector is buckled with a corresponding one of buckling portions of an electrical plug connector; wherein the electrical receptacle connector comprises a plurality of shells, and the shells are positioned at the two sides of the receptacle insulated housing and cover the locking components.

11. The electrical connector assembly according to claim 10, wherein each of the shells of the electrical receptacle connector comprises a pivoting portion and an abutting portion; each of the two sides of the receptacle insulated housing has a shaft portion pivotally connected to a corresponding one of the locking members, the pivoting portion is pivotally connected to the shaft portion and leans against the locking member, and the abutting portion leans against the locking member.

12. The electrical connector assembly according to claim 10, wherein the electrical plug connector comprises a plug insulated housing, a plurality of plug terminals, the plurality of buckling portions and a plurality of fixation members, wherein the plug terminals are at the plug insulated housing, and the buckling portions are at two sides of the plug insulated housing; the fixation members cover the two sides of the plug insulated housing; each of the buckling portions comprises a buckling hole and a recessed portion; each of the buckling holes is at a corresponding one of the fixation members, the recessed portions are at two side walls of the plug insulated housing, and each of the locking members is buckled with a corresponding one of the buckling holes and a corresponding one of the recessed portions.

13. The electrical connector assembly according to claim 10, wherein each of the locking members of the electrical receptacle connector comprises a pivoting shaft, an engaging portion, an insertion portion, and a pressing portion; the insertion portion is inserted into the elastic member, the engaging portion and the insertion portion are respectively at two sides of the pivoting shaft, and the pressing portion is exposed from the receptacle insulated housing.

14. The electrical connector assembly according to claim 13, wherein the pressing portion of the electrical receptacle connector has a trident structure, and the trident structure has a plurality of bent blocks extending toward different directions.

15. The electrical connector assembly according to claim 13, wherein the engaging portion of the electrical receptacle connector has a guiding portion, the fixation member of the electrical plug connector has a curved portion, and the guiding portion is in contact with the curved portion.

16. The electrical connector assembly according to claim 12, wherein the receptacle insulated housing of the electrical receptacle connector comprises a mating groove receiving the plug insulated housing of the electrical plug connector; each of the positioning portions of the electrical receptacle connector has a groove and a limiting slot, each of the grooves receives a corresponding one of the locking components and is in communication with the mating groove, and each of the limiting slots is at an inner side of a corresponding one of the grooves and receives a corresponding one of the elastic members.

17. The electrical connector assembly according to claim 16, wherein one end of the locking component is selectively at a buckled position of the mating groove or an unlocked position of the groove; when the end of the locking component is at the buckled position, the end of the locking component is buckled with the buckling portion of the electrical plug connector; when the end of the locking component is at the unlocked position, the end of the locking component is detached from the buckling portion of the electrical plug connector.

18. The electrical connector assembly according to claim 17, wherein the end of the locking component is moved between the buckled position and the unlocked position by rotating.

* * * * *